United States Patent [19]

Gilchrist et al.

[11] Patent Number: 5,467,529
[45] Date of Patent: Nov. 21, 1995

[54] PNEUMATIC CHECK VALVE AND METHOD FOR MAKING A PNEUMATIC CHECK VALVE

[75] Inventors: Raymond T. Gilchrist; Kevin McCoy, both of Tucson, Ariz.

[73] Assignee: AlliedSignal Inc., Morris Township, N.J.

[21] Appl. No.: 321,508

[22] Filed: Oct. 12, 1994

Related U.S. Application Data

[62] Division of Ser. No. 199,865, Feb. 22, 1994, Pat. No. 5,386,848.

[51] Int. Cl.⁶ ..................................................... B23P 15/00
[52] U.S. Cl. ............................... 29/890.128; 137/510
[58] Field of Search ................... 29/890.128; 137/510, 137/859, 315; 251/61.1; 92/98 R

[56] References Cited

U.S. PATENT DOCUMENTS

| | | | |
|---|---|---|---|
| 3,363,651 | 1/1968 | Boyd | 29/890.128 |
| 3,411,746 | 11/1968 | Scaramucci | 29/890.128 |
| 4,643,215 | 2/1987 | Phlipot et al. | 29/890.128 |
| 4,719,618 | 1/1988 | Piet | 29/890.128 |
| 4,936,342 | 6/1990 | Kojima et al. | 137/510 |

Primary Examiner—Irene Cuda
Attorney, Agent, or Firm—James W. McFarland

[57] ABSTRACT

A two-piece check valve employing an elastomeric diaphragm retained between two lands of an integral member. The integral member forms a boss on which the diaphragm is seated, and cooperates with the diaphragm to form a chamber surrounding the boss.

2 Claims, 1 Drawing Sheet

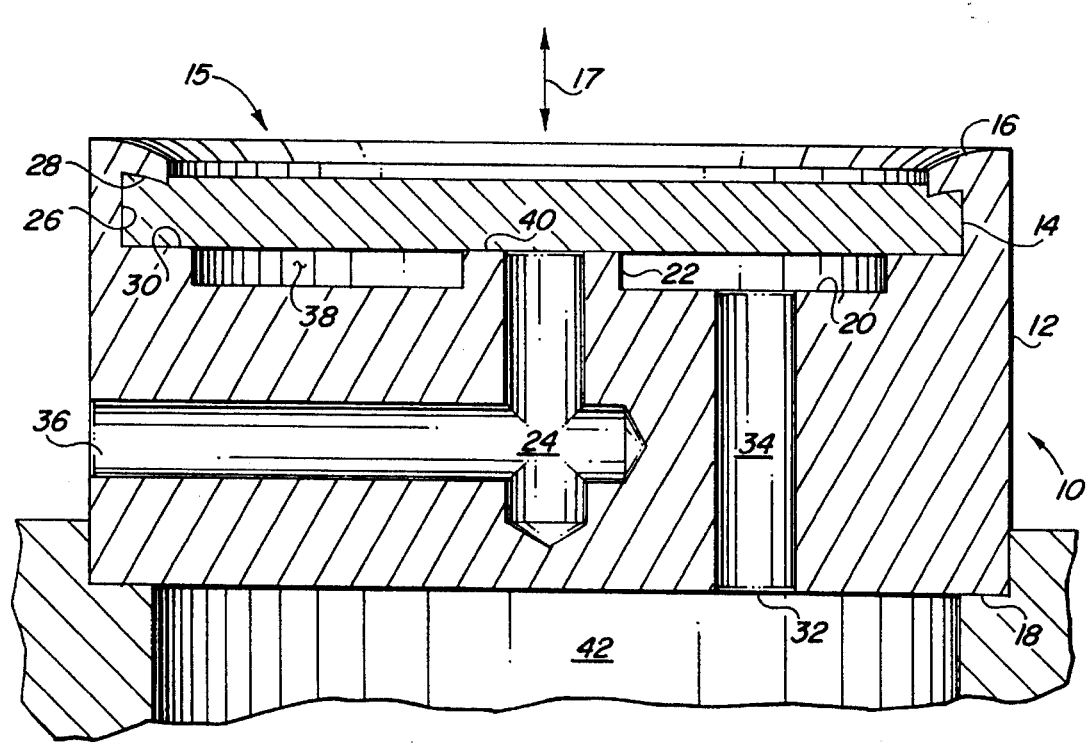

5,467,529

PNEUMATIC CHECK VALVE AND METHOD FOR MAKING A PNEUMATIC CHECK VALVE

This is a division of application Ser. No. 08/199,865, filed Feb. 22, 1994, now U.S. Pat. No. 5,386,848.

TECHNICAL FIELD

The present invention relates generally to valves and more specifically to pneumatic check valves. Still more specifically, the invention relates to miniaturized pneumatic check valves for applications characterized by a low pressure differential, and to a method for manufacturing such valves.

BACKGROUND OF THE INVENTION

Check valves typically employ a biasing mechanism such as a spring in combination with a plate or ball to ensure closure in the event of a reverse pressure condition. Other designs employ a diaphragm to open or close a channel in response to a pressure differential (see, e.g. U.S. Pat. No. 4,846,215 Barree).

Check valves that employ diaphragms as closure elements are typically constructed from at least three elements, with the diaphragm being sandwiched between two housing members (see, e.g. U.S. Pat. Nos. 3,633,605 Smith and 3,270,771 Morgan et al).

This invention provides a process for manufacturing a check valve at low cost from just two elements, and a check valve design which is particularly suitable for low-pressure-differential applications in which both low opening pressure and low leakage are desired.

SUMMARY OF THE INVENTION

A check valve in accordance with the invention comprises a diaphragm, and an integral member having first and second ends. A portion of the member near one of the ends has a C-shaped cross section and forms opposing lands. A peripheral portion of the diaphragm is captively retained between the opposing lands with the diaphram being directly exposed to ambient pressure. The member forms a central boss projecting toward the diaphragm and terminating at a valve seat. The member cooperates with the diaphragm to form a chamber surrounding the boss, and with the valve seat to form the valve. An outlet port, a first passageway extending from the outlet port to the boss, an inlet port, and a second passageway extending from the inlet port to the chamber are provided for the required fluid flow.

A method of manufacturing a check valve in accordance with the invention comprises the steps of machining a metallic, cylindrical member in an axial direction to form a first annular recess surrounding a cylindrical boss that is coaxial with the member and that projects toward a first axial extreme thereof; machining the member in a radial direction to form a second annular recess defining two opposing annular lands near the first axial extreme, the lands being coaxial with the boss; drilling a hole extending into the member from the cylindrical boss to provide a low-pressure channel; drilling a second hole extending into the member from the first annular recess to provide a high-pressure channel; inserting a circular diaphragm into the second annular recess so that an annular peripheral portion of the diaphragm is disposed between the opposing annular lands; and crimping the member onto the annular peripheral portion so that the diaphragm is captively retained by the member and cooperates therewith to form an annular chamber circumscribing the boss.

DESCRIPTION OF THE PREFERRED EMBODIMENT

In the drawing, the number 10 designates a check valve 10 which is constructed from a cylindrical aluminum housing member 12 and a circular elastomeric diaphragm 14. The number 15 designates the ambient environment in which the valve 10 is used. As is illustrated, the diaphragm 14 is directly exposed to the ambient environment 15.

The number 17 designates the axis of the cylindrical member 12, thus defining opposing axial ends 16, 18 thereof.

The member 12 is machined by conventional means to form a relatively large annular recess 20, coincidentally forming an internal boss 22 which projects toward the axial end 16. The boss 22 is initially cylindrical, and later becomes annular with the drilling of a hole to form a low-pressure channel 24. Alternatively, the channel 24 may be formed prior to forming the recess 20.

The member 12 is then machined by conventional means to form a radially-extending annular recess 26 near the axial end 16, thus forming first and second opposing annular lands 28, 30. A hole is drilled to form an inlet port 32 and a high-pressure channel 34 extending from the port to the annular recess 20. A hole is drilled along the axis of the boss 22, and joins a hole cross-drilled from a suitable location to form an outlet port 36 and the low-pressure channel 24.

The flexible diaphragm 14 is inserted in the annular recess 26 so that an annular peripheral portion of the diaphragm is captured between the opposing annular lands 28, 30. Sufficient force is then applied to the first axial end 16 of the member 12 so that it is crimped to retain the diaphragm 14 as indicated. Alternatively, the diaphragm 14 may be bonded to either or both of the lands 28, 30.

The diaphragm 14 and housing member 12 cooperate to form an annular chamber 38 which surrounds the boss 22. The upper end of the boss 22 provides an annular valve seat 40 which cooperates with the diaphragm 14 to prevent or permit flow from the chamber 38 into the low-pressure channel 24. The valve seat 40 is slightly higher (as viewed in the drawing) than the annular land 30, thus providing slight mechanical pressure which, in addition to the air pressure in the ambient environment 15, must be overcome by the pressure in the channels 24, 34 in order to open the valve 10. With proper adjustment of the dimensional difference (determined in the axial direction 17) between the land 30 and valve seat 40 both low leakage and a low crackpoint (i.e. differential pressure required to open valve) can be achieved.

In an exemplary use, the check valve 10 serves as a component of an outflow valve controller in a cabin pressure control system for an aircraft. The ambient environment 15 is at cabin pressure and high-pressure channel 34 is in direct fluid communication with the rate chamber (designated at 42) of the controller . The pressure load on the valve 10 is normally from the rate chamber 42 to the ambient environment 15. Upon occurence of an abnormal condition (e.g. loss of cabin airflow, intentional depressurization, air transients, subsystem failure) the cabin pressure becomes lower than the pressure in the rate chamber 42. The valve then acts to equalize the pressure in the rate chamber 42 and cabin by displacement of the diaphragm 14 away from the valve seat 40, thus enabling flow from the annular chamber 38 to the low-pressure channel 24.

It should be understood from the foregoing description that the invention provides a unique and advantageous method for manufacturing a diaphragm-type check valve, and a check valve which produces a negligible leakage rate while also providing a low crackpoint. The fact that, for the preferred embodiment of the invention, the diaphragm and integral member are described as circular and cylindrical, respectively, is not intended as limiting since the two members of the valve can have other common shapes without departing from the scope of the invention.

What is claimed is:

1. A method of manufacturing a check valve, comprising the steps of:

machining a metallic, cylindrical member in an axial direction to form a first annular recess surrounding a cylindrical boss that is coaxial with the member and that projects toward a first axial extreme thereof;

machining the member in a radial direction to form a second annular recess defining two opposing annular lands near the first axial extreme, the lands being coaxial with the boss;

drilling a hole extending into the member from the cylindrical boss to provide a low-pressure channel;

drilling a second hole extending into the member from the first annular recess to provide a high-pressure channel;

inserting a circular diaphragm into the second annular recess so that an annular peripheral portion of the diaphragm is disposed between the opposing annular lands; and crimping the member onto the annular peripheral portion so that the diaphragm is captively retained by the member and cooperates therewith to form an annular chamber circumscribing the boss.

2. A method as recited in claim 1 wherein the steps are performed in the order recited.

* * * * *